United States Patent [19]
Bauer et al.

[11] Patent Number: 5,322,471
[45] Date of Patent: Jun. 21, 1994

[54] VENTILATION APPARATUS

[75] Inventors: Karl-Heinz Bauer; Jörgen Bauer, both of Bad Neustadt/Saale, Fed. Rep. of Germany

[73] Assignee: Preh-Werke GmbH & Co. KG, Bad Neustadt/Saale, Fed. Rep. of Germany

[21] Appl. No.: 26,297

[22] Filed: Mar. 4, 1993

[30] Foreign Application Priority Data

Mar. 6, 1992 [EP] European Pat. Off. ........ 92103813.9

[51] Int. Cl.$^5$ .............................................. B60H 1/28
[52] U.S. Cl. ...................................... 454/69; 361/678; 454/148
[58] Field of Search .................. 454/69, 143, 146, 148; 200/289; 361/678, 695

[56] References Cited

U.S. PATENT DOCUMENTS

| 2,824,939 | 2/1958 | Claybourn et al. ............. 361/678 X |
| 3,088,013 | 4/1963 | Watson ............................ 200/289 X |
| 3,213,232 | 10/1965 | Gryctko ........................... 361/678 X |

FOREIGN PATENT DOCUMENTS

| 0143176 | 6/1985 | European Pat. Off. . |
| 0363191 | 4/1990 | European Pat. Off. . |
| 7138451 | 2/1972 | Fed. Rep. of Germany . |
| 2360934 | 3/1978 | France . |
| 69791 | 5/1980 | Japan ..................................... 454/64 |
| 2146826 | 4/1985 | United Kingdom .................. 454/64 |

OTHER PUBLICATIONS

Bosch, *Kraftfahr Technisches Taschenbuch*, ISBN3-1-8-419105-2, VDI Verlag, Sep. 1987, pp. 568, 569, 572, 573 and 606-609.

*Primary Examiner*—Harold Joyce
*Attorney, Agent, or Firm*—Griffin, Butler, Whisenhunt & Kurtossy

[57] ABSTRACT

A motor vehicle ventilation apparatus for providing ventilation by a fan (3), located within an air channel (1) of the apparatus, whose operation can be multiply, or step, adjusted by "switching in" performance resistors (8). The performance resistors (8) and a step switch (7) required for adjusting operation of the fan (3) are arranged on members forming the air channel (1), or are in the air channel, within an effective ventilating range of the fan (3).

10 Claims, 4 Drawing Sheets

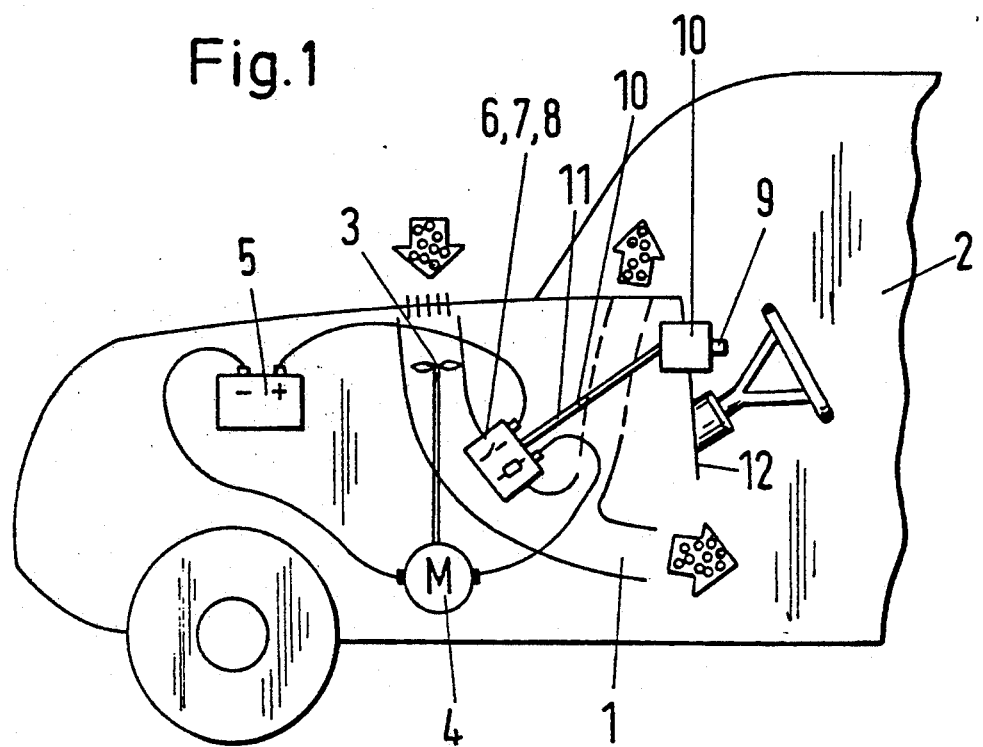
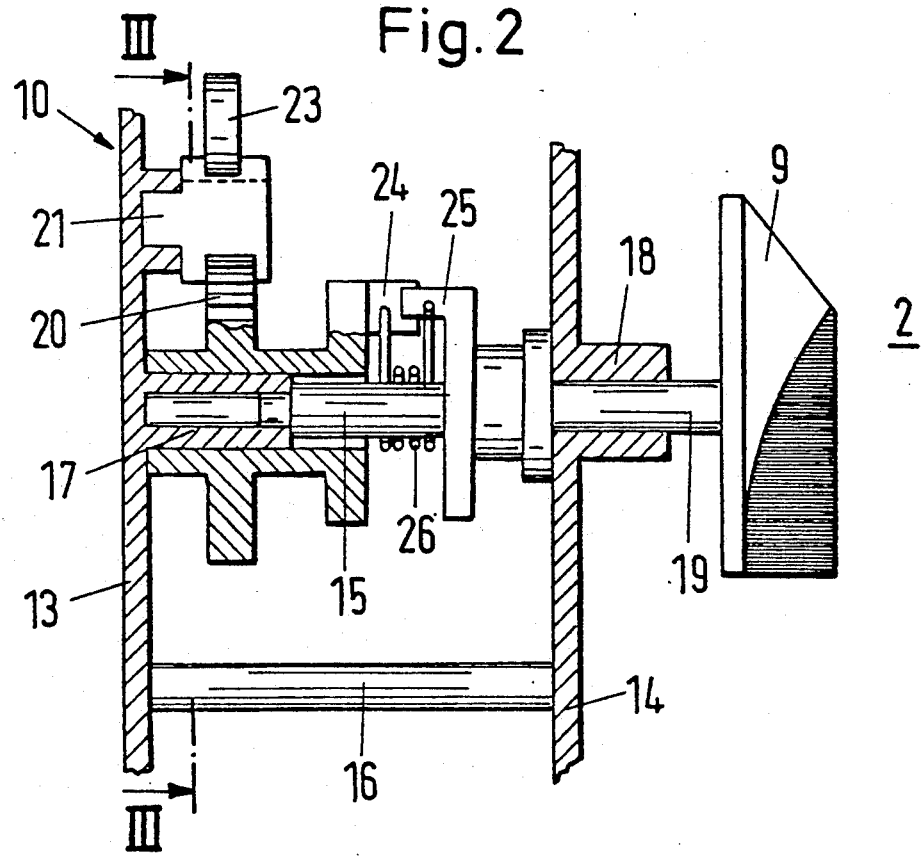

VENTILATION APPARATUS

BACKGROUND OF THE INVENTION

This invention relates to a ventilation apparatus for a motor vehicle comprising a member for defining an air channel, a multiply adjustable fan located within the air channel which is driven by an electrical motor, and a switching device coupled to the motor for multiple-step adjustments of operation of the fan, wherein is included performance resistors which are located within an effective ventilating range of the fan and which can be selectively switched by means of a step switch which is mechanically activated from a passenger compartment for controlling the electrical motor in steps.

Such apparatus can be found frequently in motor vehicles and are known from prior art. A publication "Kraftfahrtechnisches Taschenbuch" of the R. Bosch company shows in its 20th edition, pages 568 and 569, a circuit diagram of a motor vehicle, in sub-portion 7 of which is schematically disclosed a fan of a ventilation apparatus which is adjustable by means of series-connected resistors. Setting the ventilation apparatus to different ventilating levels adjusts an air volume thereby moved to requirements for the passenger compartment.

Such prior art ventilation apparatus normally has an electrical step switch located on a dashboard. For practical reasons, the step switch is directly coupled to an adjustment handle located inside the passenger compartment on the dashboard. The adjustment directions of the handle and the switch (that is, the arrangement of contacts of the step switch) are usually the same; for example, lengthwise or circular. An electrical motor of a fan of the ventilation apparatus can be coupled to a power source of the motor vehicle by means of the step switch. The fan which is driven by the electrical motor produces an air stream, or flow, in an air channel of the apparatus, thereby ventilating the passenger compartment. The fan can be adjusted stepwise through several switching steps of the step switch, wherein performance resistors with varying resistance values are placed in series with the electrical motor of the fan to provide several settings, or adjustment steps. A performance resistor arranged in series with the electrical motor reduces the drive power according to its value, thereby determining the airstream volume, or speed, for a particular ventilation level. The performance resistors are made of regular twisted resistor wire. Because the performance resistors develop a great deal of heat during operation, they are arranged a distance from the step switch, within effective ventilating range of the fan; that is, they extend into the air channel and are cooled by the air stream therein. In the prior art, performance resistors are arranged in a compact group of components which is often coated by a ceramic mass to prevent electrical sparks. The performance resistors are electrically coupled to the step switch and the electrical motor by means of a multi-wire cable.

For a 250 Watt electrical motor electrical currents of up to approximately 20 Amps can be drawn. Accordingly, the diameter of an individual conductor in a multi-wire connection cable is chosen to be 2.5 mm². From experience, the temperature at the switch contact of the step switch increases by approximately 30° C. at a current of 20A. The interior of a motor vehicle can reach 70° C., for example in sunny weather, so that upon operation of the fan of the ventilation apparatus at full power for ventilating the interior, temperatures of approximately 100° C. are reached at the switch contact of the step switch, that is, on the dashboard.

This circumstance and the great self-generation of heat by the performance resistors during operation leads to the known and frequently used segmentation of a stepwise adjustable ventilation apparatus so that a first component group of a switching device has a step switch, often with notches, on the dashboard, a second component group of the switching device frequently comprises several performance resistors arranged within the air channel, with a connecting element having a large-diameter multi-wire cable electrically coupling the first component group to the second component group, and a third component group being likewise electrically coupled to the step switch including a fan driven by the electrical motor.

Smoothly adjustable (non-step) ventilation apparatus are also known from the prior art. Such apparatus, which are in most cases electronically adjustable, are not related to this invention.

Recently, fans of ventilation apparatus have been required to deliver higher outputs, particularly when one or several filters arranged in air channels have become increasingly blocked with increasing life spans, thus hindering ventilation of passenger compartments because of increases in air-flow resistance. Such obstacles can be compensated at least partially by higher fan performance. In the past, fan motors of 250 Watt capacity have been used, but recently, fan motors with performance capacities of up to 500 Watts have come into use; and this may be further increased in the future. Thus, maximum operation currents are being increased, for example, to 40 Amps and more. As a result of such higher currents, the wire diameters of the multi-wire connection cables of the circuit apparatus must be increased to 4 mm². Such a cable is substantially more expensive and more difficult to manipulate. Another result of higher currents is a rise in temperature at the step switch contacts, thus reducing the life span of the step switch and of neighboring, particularly electronic, components. These higher temperatures could, for example, be avoided by using a step switch with lower contact resistance, however, such a power switch often lacks a desired ease of adjustment and life span. It is an object of this invention to overcome these described problems and increased costs which have been brought about by increased performance demands by providing a ventilation apparatus of the type described above which is improved in a different manner.

SUMMARY

In this invention, a step switch is located within effective ventilating range of a fan as are performance resistors. Thus, the step switch is at least partially affected by an air stream, and excess heat, such as from contacts heated by a nominal, or rated, current which flows at maximum fan power, can then be dissipated by means of the air flow.

BRIEF DESCRIPTION OF THE DRAWINGS

The invention is described and explained in more detail below using the embodiments shown in the drawings. The described and drawn features, in other embodiments of the invention, can be used individually or in preferred combinations. The foregoing and other objects features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

FIG. 1 is a simplified schematic side view of a ventilation apparatus according to this invention shown in a simplified car profile;

FIG. 2 is a cross-sectional view of an adjustment handle and its adjustment mechanism for transmitting an adjustment movement used in the apparatus of FIG. 1;

DESCRIPTION OF THE PREFERRED EMBODIMENT

Figure 3:
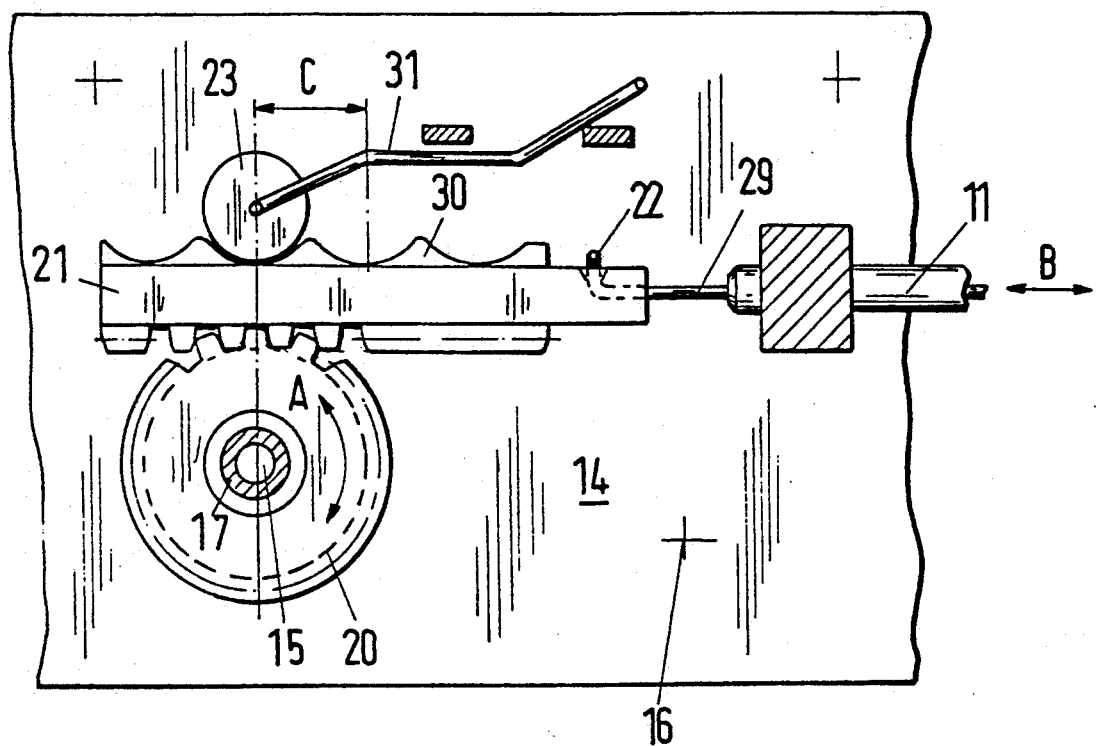
FIG. 3 is a cross-sectional view of the adjustment mechanism taken on line III—III in FIG. 2.

A schematic view of a ventilation apparatus of this invention, having an air channel 1, can be seen within the contours of a motor vehicle front end in FIG. 1. Air which comes from outside and/or air which has been warmed by passing through a motor compartment of the vehicle is guided into a passenger compartment 2, by way of an air channel 1, where it dissipates. The air flow in the air channel 1 is supported, or created, by a fan 3, particularly when the vehicle does not move.

The fan 3 is driven by a fan motor 4, which is usually integrated with the fan into one component. The fan motor 4 receives its power from a power source 5 of the motor vehicle in such manner that the motor 4 can be uncoupled from the power source 5, to be thereby turned off, by means of a switching device 6. The switching device 6 is mounted to a wall defining the air channel 1; that is, it partially extends into the air channel and is there cooled by an air stream therein generated, or produced, by the fan 3. Thus, the switching device 6 is located within an effective ventilating (or cooling) range of the fan 3 to be thereby cooled. The switching device comprises a multi-step step switch 7 and a group of performance resistors 8. An adjustment handle 9 for setting the step switch 7 is located inside the passenger compartment. Setting, or adjustment, motions of the adjustment handle 9 are transmitted to the step switch via adjustment mechanisms 10, 11. The adjustment motions of the adjustment handle 9 are converted and transmitted by the adjustment mechanism 10 so as to adapt them to requirements of the step switch. A Bowden control cable 11, having a flexible steel hose, transmits the adjustment movements. The step switch 7 has several switching positions for different fan performance levels.

Elements of the adjustment mechanism 10, particularly those for converting adjustment movements, and the adjustment handle 9 are mounted at the dashboard 12 of the motor vehicle. As can be seen in FIG. 2, an adjusting shaft 15 is located between side walls 13, 14 which are held separated from one another by spacers 16. The side walls 13, 14 have bearings 17, 18 which hold the adjusting shaft 15. The adjusting shaft 15 extends through the side wall 14, where an outer, free, shaft end 19 is connected to the adjustment handle 9 which is manipulated from inside the passenger compartment. A pinion 20 rotates on the outer surface of one bearing 17 and further drives a rack 21 which extends into, and rides on, the side wall 13. The rack 21 engages the Bowden control cable 11, as can be seen in FIG. 3, and is loaded, or biased, by an indexing wheel 23. A drive arm 24 is molded onto the pinion 20. The adjustment shaft 15 has a V-shaped adjustment arm 25. The drive arm 24 extends into a path of a fork of the V of the adjustment arm 25 to be engaged thereby and to be thereby rotatably adjusted. In this regard, the adjustment arm 25 and the drive arm 24 are elastically connected by means of a spring 26 until they actually touch. The spring supports operation of the indexing wheel 23. When using the adjustment mechanism 10 an adjustment manipulation of the handle 9 is transmitted to the rack 21, in that, according to FIG. 3, a turn of the pinion (arrow A) is converted into a linear stroke (arrow B) of the rack 21 and the attached Bowden control cable 11. The Bowden control cable 11, as an element of the adjustment mechanism 10, transfers the stroke B to an adjustment member 27 (FIG. 4) of the step switch 7. A hose, or sleeve, of the Bowden control cable 11 is anchored to a receiver, or frame, 28 at an inner, or driven, end thereof. An uncovered inner end of an adjustment wire 29 of the Bowden control cable is coupled to the rack 21 to be movable therewith by a hook, or link, 22. The rack 21 has cams, or notches, 30. The indexing wheel 23 is spring-loaded by means of a spring 31 and cooperates with the notches 30 in accordance with, or corresponding to, visible markings on the adjustment handle 9. Markings, or notches, C correspond to the switching steps of the step switch 7.

Figure 4:
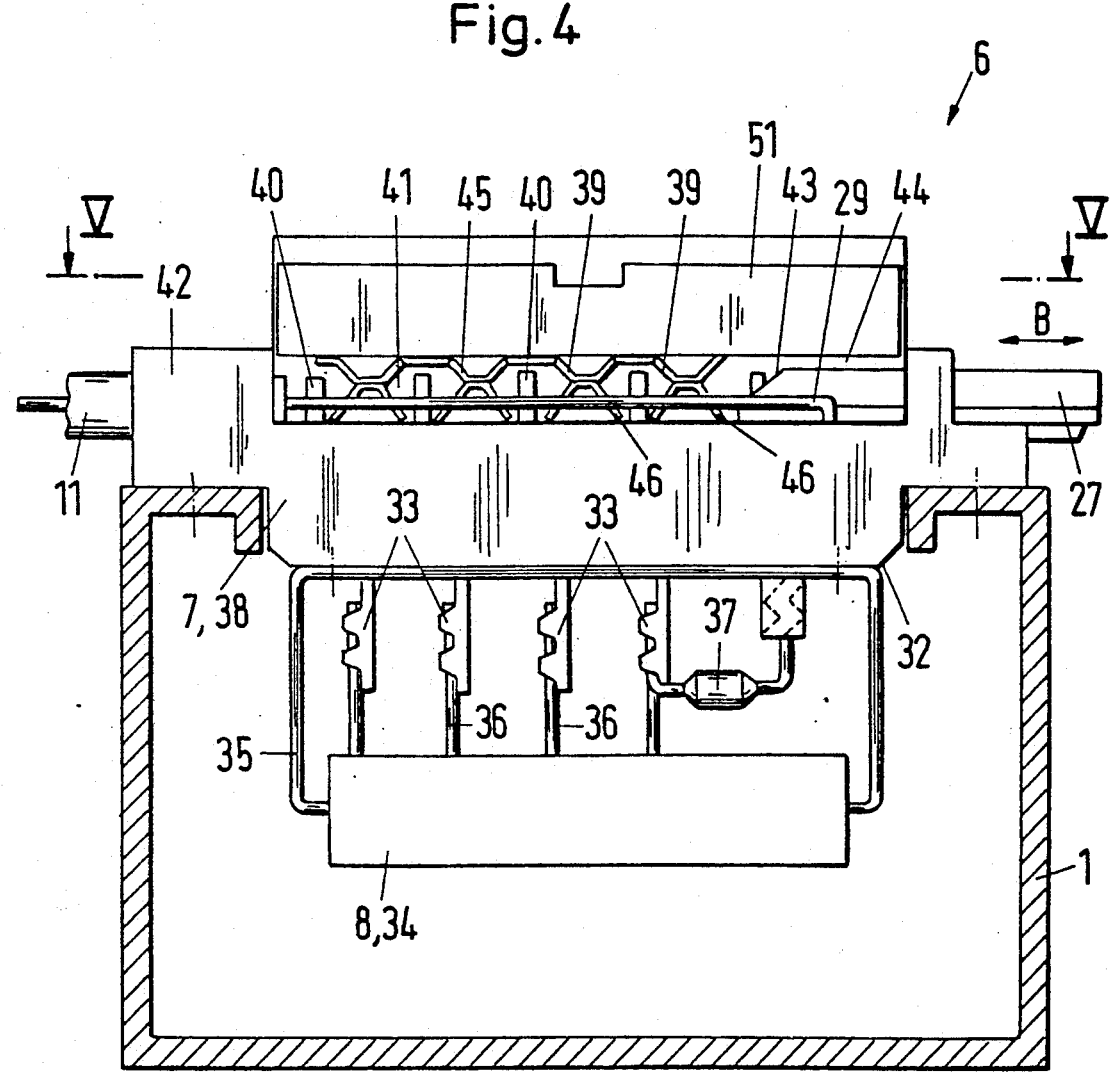
FIG. 4 is a partially, cross-sectional view of a step switch driven by the adjustment mechanism of FIG. 2.
Figure 5:
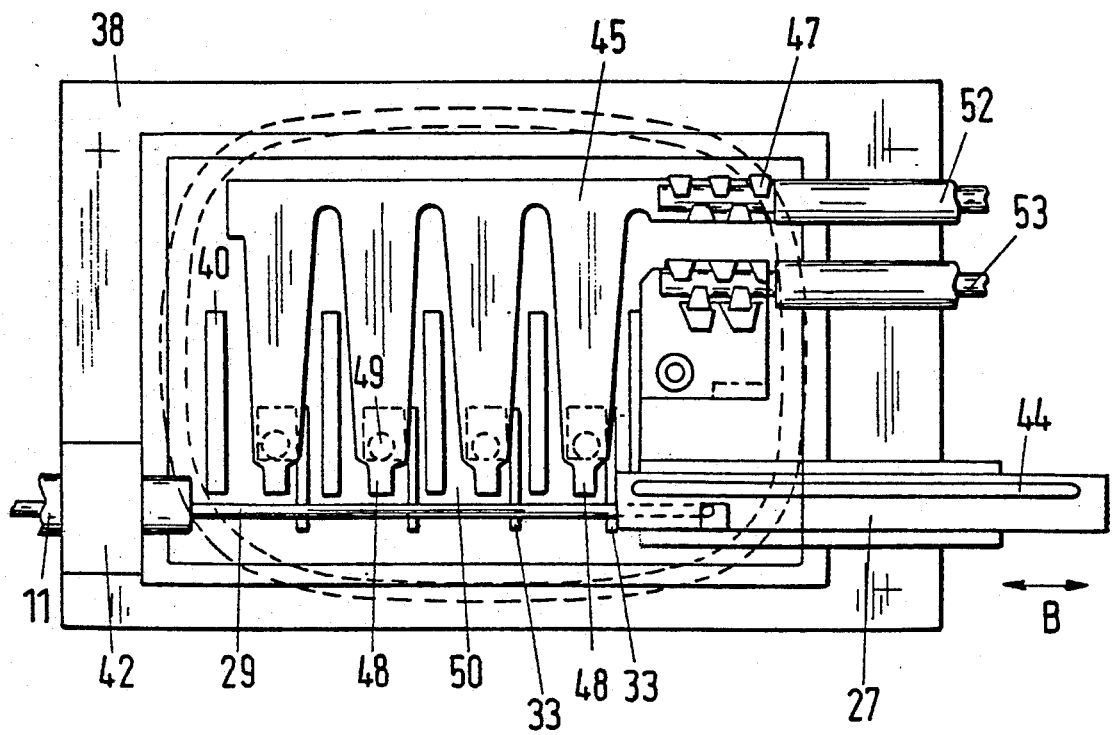
FIG. 5 is a lengthwise view taken on line V—V in FIG. 4 of the step switch.

FIGS. 4 and 5 show the switching device 6 of the ventilation apparatus as including a multiple step switch 7 and several performance resistors 8 built as parts of one component and flanged (shaped like a flange and mounted) onto an opening 32 of the air channel wall 1. In this regard, portions of the step switch 7, particularly contact terminals 33 thereof, which are constructed to be good heat conductors, and the performance resistors 8 which are coupled thereto, extend into the air channel 1 and can be cooled by the air flow therein. The performance resistors 8 are embedded in a ceramic mass, thus forming a resistor block 34 made up of several individual resistors 8, 8', 8", while a collar, or sleeve, (a channel-shaped mount) 35 mounts the resistor block 34 on the step switch 7. Terminals 36 of individual performance resistors 8 extend from the resistor block 34 and each is respectively electrically coupled by means of a clamp to a contact terminal 33 of the step switch 7. A thermo fuse 37 protects the switching device 6 from overheating by interrupting the current flowing to the fan motor 4, if necessary. A housing 38 of the step switch 7 is made from heat-tolerant plastic. Switch contacts 39 are arranged to be held in pairs inside a housing 38. In the depicted embodiment, the switch contact pairs 39 are located outside the air channel 1, but in another embodiment, they may, of course, also be located inside the air channel 1. Cross walls, or members, 40 divide individual switch contact pairs 39, thus creating switching chambers 41. A driving, or controlling, outer end of the Bowden control cable sleeve 11 is affixed to a receiver 42 at the housing 38 of the step switch 7. An outer free end of the adjustment wire 29 of the Bowden control cable 11 extends outwardly to be coupled to the adjustment member 27 for movement therewith. The adjustment member 27 is movable inside the housing 38 in the direction of the stroke B, and follows the adjustment movements of the handle 9 between end positions. The adjustment member 27 is an insulated element having a slanted edge 43 and a gliding surface 44. When the adjustment member 27 is moved past the switch contact pairs 39 by the adjustment wire 29 of the Bowden control cable 11, the switch contact pairs 39 are serially opened or closed in accordance with a stroke direction.

In the depicted embodiment, the switch contacts 45, 46 of a switch contact pair 39 are closed when the adjustment member 27 is not engaged therewith. One switch contact 46 of each contact pair is an opposite end of its contact terminal 33. The other switch contact 45 of each contact pair (all of which are electrically coupled to a collective terminal 47) is extended beyond its contact area 49 by means of a protruding nose 48. The moved adjustment member 27 slides with its slanted edge 43 along a line 50 underneath the protruding noses 48 and lifts them onto its gliding surface 44, thereby separating switch contacts 45 and 46.

In another embodiment of this invention, switch contacts 45, 46 are provided which are open in a starting position and which make contact by means of a different type of adjustment member.

The step switch 7 is made dustproof by means of a door, or flap, 51. FIG. 5 shows electrical terminals as seen from the outside, wherein a conductor 52 is coupled to the power source 5 and another conductor 53 is coupled to the fan motor 4.

Figure 6:
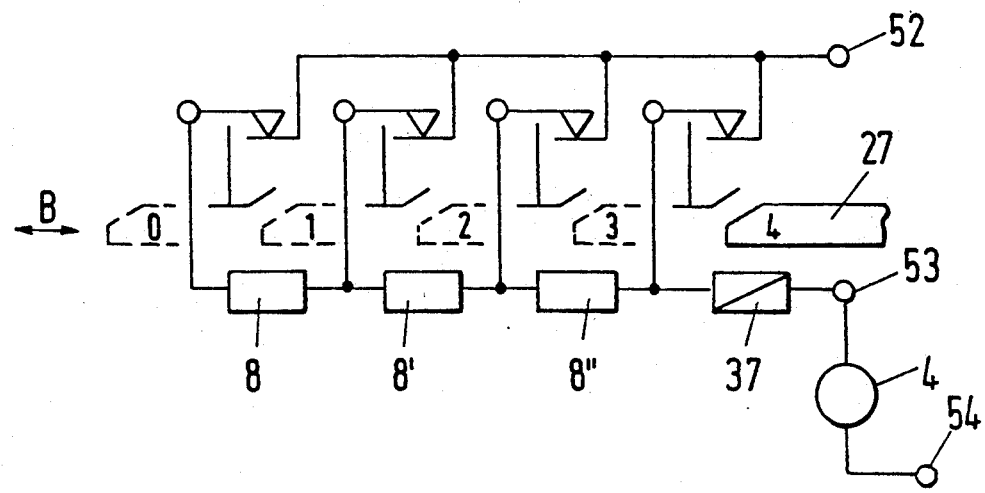
FIG. 6 is an equivalent schematic circuit diagram of the step switch.

An equivalent schematic circuit diagram in FIG. 6 shows a method of operation of the step-adjustable ventilation apparatus of this invention. Positions 0 to 4 of the adjustment member 27, indicated by dashed lines, show five switching positions of the step switch. In position 0 the current flow is interrupted between contacts 52 and 54, while the fan motor 4 is deactivated. In position 1, one switch contact pair is closed, thus allowing current to flow from contact 52 via the three performance resistors having resistance values of, for example, 1.6 Ohm (8), 0.8 Ohm (8') and 0.4 Ohm (8"), the thermo fuse 37, the fan motor 4 and the contact 54 to return to the power source 5. The energized power resistor block having a collective resistance of 2.8 Ohm results in a low fan output at this switching step. In positions 2 and 3, the engaged resistance values are stepwise reduced and the fan output increases correspondingly. In position 4, the current flows directly from contact 52 to the fan motor 4 via the thermo fuse 37, while the fan is working at a maximum because of the disengaged performance resistors 8, 8' and 8".

While the invention has been particularly shown and described with reference to a preferred embodiment, it will be understood by those of ordinary skill in the art that various changes in form and detail may be made therein without departing from the spirit and scope of the invention.

A benefit of this invention is that a full-capacity, rated, or nominal, current which flows between the step switch and the performance resistors upon maximum fan operation only requires a relatively short connection cable therebetween, because the step switch can be arranged in close proximity to the performance resistors. If the step switch and the performance resistors are integrated into one component, as described above, no connection cable is needed. This is an important benefit of the ventilation apparatus of this invention as compared to prior-art apparatus.

The spatial distance between the step switch and the adjustment handle resulting from the arrangement of this invention could cause an impairment of the adjustment process. In addition, linkage tolerances could occur which would cause an incongruence between optical or tactical markings of the adjustment handle and correlated switching positions of the step switch. Such practical aspects, which could detract from this invention, are to be taken into consideration by particularly careful selection of suitable switching elements and by choosing a suitable step switch. A good choice for such adjustment, or linkage, mechanisms are those, for example, which do not require undue linkages or alignments, thus allowing more leeway in positioning the adjustment handle and the step switch independently of one another. A Bowden control cable in a flexible steel hose is a good example of such an adjustment mechanism. Also advantageous for use in this invention are adjustment mechanisms, or devices, which convert one type of adjustment motion, for example a turning motion, into another type of motion, such as a longitudinal, or lengthwise, motion. Similarly, such adjustment mechanisms which are capable of shortening or lengthening adjustment steps, for example adjustment levers or gears, are advantageous. Adjustment mechanisms of this kind can adapt adjustment steps of a handle, which are predetermined by design, to requirements of the step switch. Such adjustment mechanisms also allow for some leeway, for example, in calibrating lengths of adjustment steps of the step switch, which is helpful in overcoming construction deviations or step tolerances. Accordingly, an appropriate step switch is planned for use such that a largest possible step deviation over a stroke can be compensated for. Preferably, an insulated element which can be moved by the adjustment mechanism is used as a switching member of the step switch, the element moving through stationary pairs of switch contacts according to a certain length of travel, thus closing or opening the pairs of switch contacts, dependent upon a type thereof. Contact tolerances are not an undue concern in such an arrangement.

The embodiments of the invention in which an exclusive property or privilege are claimed are defined as follows:

We claim:

1. A ventilation apparatus for a motor vehicle, particularly for ventilating a passenger compartment thereof, comprises a means for defining an air channel, a multiply adjustable fan located within said air channel, said fan being driven by an electrical motor with a switching device coupled to said motor for multiple-step adjustments of operation of said fan, wherein said switching device comprises resistors which are located within an effective ventilating rang of said fan and which can be selectively switched by means of a step switch which is mechanically activated from the passenger compartment for controlling the electrical motor in steps, and wherein said step switch is located within the effective ventilating range of the fan.

2. A ventilation apparatus as in claim 1 wherein the step switch can be operated by means of an adjustment handle, which is located in the passenger compartment, via a mechanical linkage means for linking said adjustment handle and said step switch which does not require an alignment of said step switch and said adjustment handle.

3. A ventilation apparatus as in claim 2 wherein said linkage means includes a Bowden control cable.

4. A ventilation apparatus as in claim 2 wherein said linkage means further includes means for converting an adjustment motion of said handle from one type of motion to another type of motion.

5. A ventilation apparatus as in claim 1 wherein said resistors and said step switch, which are located within effective ventilating range of said fan, are structurally integrated into one component.

6. A ventilation apparatus as in claim 5 wherein said integrated structural component, which comprises said performance resistors and said step switch, is flange coupled to an opening of said air channel with at least a portion of said component extending thereinto.

7. A ventilation apparatus as in claim 5 wherein said resistors are arranged within said air channel and said step switch is arranged outside thereof.

8. A ventilation apparatus as in claim 5 wherein said resistors located inside said air channel are directly electrically coupled by means of clamps to heat-conducting contact terminals of said step switch which are located inside said air channel.

9. A ventilation apparatus as in claim 1 wherein said step switch has stationary switch contact pairs and an insulated element which is driven to serially open and close said switch contact pairs.

10. A ventilation apparatus as in claim 5 wherein said step switch has stationary switch contact pairs and an insulated element which is driven to serially open and close said switch contact pairs.

* * * * *